United States Patent
Chung et al.

(10) Patent No.: US 11,609,148 B2
(45) Date of Patent: Mar. 21, 2023

(54) METHOD AND APPARATUS FOR ANALYSIS AND DETECTION OF ENCROACHMENT AND IMPACT UPON UNDERGROUND STRUCTURES

(71) Applicant: Acellent Technologies, Inc., Sunnyvale, CA (US)

(72) Inventors: Hung Chi Chung, Sunnyvale, CA (US); Franklin Li, Sunnyvale, CA (US); Cas Cheung, Sunnyvale, CA (US)

(73) Assignee: ACELLENT TECHNOLOGIES, INC., Sunnyvale, CA (US)

( * ) Notice: Subject to any disclaimer, the term of this patent is extended or adjusted under 35 U.S.C. 154(b) by 0 days.

(21) Appl. No.: 15/793,835

(22) Filed: Oct. 25, 2017

(65) Prior Publication Data

US 2018/0113049 A1 Apr. 26, 2018

Related U.S. Application Data

(60) Provisional application No. 62/412,714, filed on Oct. 25, 2016.

(51) Int. Cl.
*G01M 5/00* (2006.01)

(52) U.S. Cl.
CPC ........ *G01M 5/0025* (2013.01); *G01M 5/0033* (2013.01); *G01M 5/0066* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,953,144 A | * | 8/1990 | Chin | G01V 1/001 181/112 |
| 6,138,512 A | * | 10/2000 | Roberts | G01M 3/243 73/40 |
| 6,785,618 B2 | * | 8/2004 | Kechter | F17D 5/06 702/39 |
| 7,203,322 B1 | * | 4/2007 | Bostock | H04R 1/1083 381/67 |
| 2002/0038199 A1 | * | 3/2002 | Blemel | F17D 5/02 702/183 |
| 2009/0000381 A1 | * | 1/2009 | Allison | F16L 55/00 73/596 |
| 2009/0245026 A1 | * | 10/2009 | Bufi | G08B 13/1672 367/135 |

(Continued)

FOREIGN PATENT DOCUMENTS

GB 2488657 A * 9/2012 ............. G01N 29/14

*Primary Examiner* — Jennifer Bahls
(74) *Attorney, Agent, or Firm* — Dentons US LLP

(57) ABSTRACT

A structural health monitoring system comprises a first set of sensors operable for coupling to a structure positioned under ground, the first set of sensors further configured to detect an impact upon the structure while the first set of sensors is positioned under the ground; a second set of sensors operable to be positioned on or proximate to a surface of the ground, the second set of sensors further configured to detect an audible event occurring at a distance from the second set of sensors and the structure; and a computer readable memory storing one or more audio signatures that may correspond to the audible event.

20 Claims, 9 Drawing Sheets

(56) References Cited

U.S. PATENT DOCUMENTS

| | | | |
|---|---|---|---|
| 2010/0078090 A1* | 4/2010 | Miller | H01L 41/1132 138/141 |
| 2011/0113887 A1* | 5/2011 | De Lorenzo | G01D 11/24 73/649 |
| 2011/0161038 A1* | 6/2011 | Sutherland | F16L 55/48 702/103 |
| 2014/0207389 A1* | 7/2014 | Hayner | G01M 3/243 702/33 |

* cited by examiner

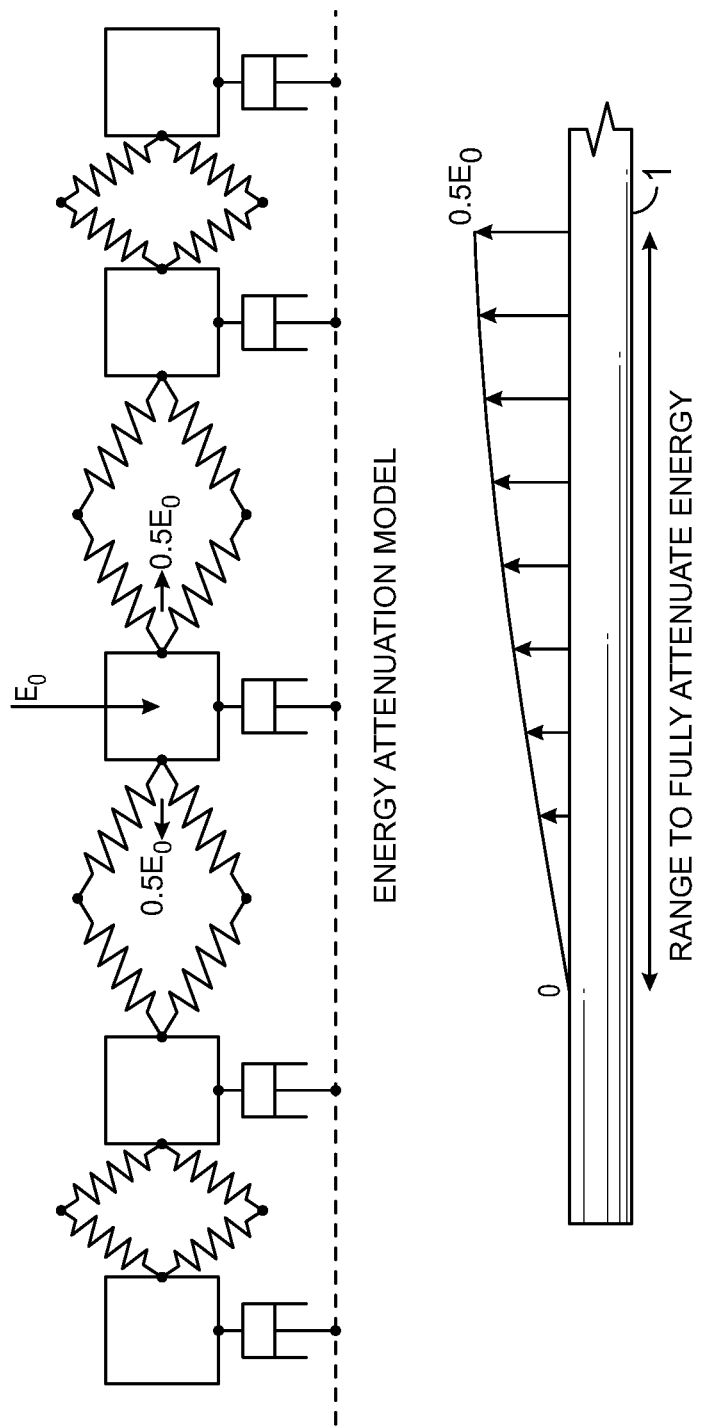

METHOD AND APPARATUS FOR ANALYSIS AND DETECTION OF ENCROACHMENT AND IMPACT UPON UNDERGROUND STRUCTURES

PRIORITY

This application claims priority to, and the benefit of, U.S. Provisional Patent Application No. 62/412,714 filed on Oct. 25, 2017, the entire content of which is hereby incorporated by reference.

GOVERNMENT RIGHTS

This invention was made with State of California support under California Energy Commission Grant Number PIR-14-015. The Energy Commission has certain rights to this invention.

BRIEF DESCRIPTION

Embodiments of the invention relate generally to structural health monitoring. More specifically, embodiments of the invention relate to the analysis and detection of encroachment and impact upon underground structures.

BACKGROUND

Structures buried underground can be difficult to locate and monitor. Many in the vicinity of such structures are not even aware of their existence. Accordingly, there is a risk of damage to such underground structures. For instance, nearby construction work or excavation may encroach upon the structure, perhaps even damaging it. Numerous instances exist of heavy construction equipment accidentally rupturing underground pipelines or electrical conduits while digging, or even of individual workers with picks and shovels inadvertently severing wires or damaging pipes.

Efforts have thus been made in the past to keep track of the locations of underground structures, and to warn or at least inform those nearby of the presence of such structures.

SUMMARY

Aspects of the invention can be implemented in many ways, for example as an apparatus or as a method. In one embodiment, a structural health monitoring system comprises: a first set of sensors operable for coupling to a structure positioned under ground, the first set of sensors further configured to detect an impact upon the structure while the first set of sensors is positioned under the ground; a second set of sensors operable to be positioned on or proximate to a surface of the ground, the second set of sensors further configured to detect an audible event occurring at a distance from the second set of sensors and the structure; and a computer readable memory storing one or more audio signatures that may correspond to the audible event.

The first set of sensors may comprise piezoelectric transducers.

The structure may be a pipe or pipeline.

The structural health monitoring system may further comprise: a controller in electronic communication with the first set of sensors and the second set of sensors; and a transmitter in electronic communication with the controller.

The first set of sensors may be configured to receive stress waves generated in the structure by the impact, to convert the received stress waves to corresponding electrical signals, and to transmit the corresponding electrical signals to the controller; and the controller may be configured to receive the transmitted corresponding electrical signals from the first set of sensors, to selectively generate an alert signal, and to transmit the alert signal to the transmitter.

The second set of sensors may be configured to detect sound waves generated by the audible event, to convert the received sound waves to corresponding signals, and to transmit the corresponding signals to the controller; and the controller may be configured to receive the transmitted corresponding signals from the second set of sensors, to selectively generate an alert signal, and to transmit the alert signal to the transmitter.

The controller may be further configured to: retrieve the one or more audio signatures from the memory; compare the one or more audio signatures to the transmitted corresponding signals; upon a match between the one or more audio signatures and the transmitted corresponding signals, generate an identifier signal corresponding to the match; and transmit the identifier signal to the transmitter.

The structural health monitoring system may further comprise a controller in electronic communication with the first set of sensors, the controller configured to estimate a location of the impact on the structure.

The controller may be further configured to estimate the location according to a profile of energy generated by the impact.

The structural health monitoring system may further comprise a controller in electronic communication with the second set of sensors, the controller configured to estimate a distance between the audible event and the structure.

The controller may be further configured to estimate the distance between the audible event and the structure according to energies of sound waves generated by the audible event and detected by multiple ones of the second set of sensors.

The second set of sensors may comprise microphones.

In another embodiment, a pipeline monitoring system comprises: a first set of sensors configured to be operably coupled to an underground pipeline, the first set of sensors further configured to detect an impact upon the underground pipeline; a second set of sensors configured to be operably positioned above ground to correspond to the pipeline, the second set of sensors further configured to detect an audible event occurring at a distance from the second set of sensors; and a controller in electronic communication with the first set of sensors and the second set of sensors, the controller configured to estimate the distance, and to estimate a location of the impact on the pipeline.

The first set of sensors may be configured to receive stress waves generated in the pipeline by the impact, to convert the received stress waves to corresponding electrical signals, and to transmit the corresponding electrical signals to the controller; and the controller may be configured to receive the transmitted corresponding electrical signals from the first set of sensors, and to selectively generate an alert signal according to an energy of the corresponding electrical signals.

The second set of sensors may be configured to detect sound waves generated by the audible event, to convert the received sound waves to corresponding signals, and to transmit the corresponding signals to the controller; and the controller may be configured to receive the transmitted corresponding signals from the second set of sensors, and to selectively generate a signal indicating a type of machine corresponding to the detected sound waves.

The controller may be further configured to: retrieve one or more audio signatures corresponding to operational sounds of one or more machines; compare the one or more audio signatures to the transmitted corresponding signals; and upon a match between the one or more audio signatures and the transmitted corresponding signals, generate an identifier signal identifying which of the one or more machines corresponds to the match.

The controller may be further configured to estimate the distance according to energies of sound waves generated by the audible event and detected by multiple ones of the second set of sensors.

The first set of sensors may comprise piezoelectric transducers.

The second set of sensors may comprise microphones.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which:

FIG. 4 and FIG. 5 illustrate principles of a mechanical model for estimating the location of impacts upon an underground structure;

Like reference numerals refer to corresponding parts throughout the drawings.

DETAILED DESCRIPTION

The various Figures are not necessarily to scale. All numerical values are approximate, and may vary. All examples of specific elements as well as their materials and compositions are to be taken as nonlimiting and exemplary only. Other suitable items, materials and compositions may be employed instead.

In one embodiment, the invention involves two sets of sensors, one placed on an underground structure such as a pipeline, and the other placed above ground nearby. The sensors on the pipeline detect impacts upon the pipe, while the above ground sensors detect nearby incidents such as the passing or operating of certain vehicles or machinery. In this manner, embodiments of the invention can detect both impacts upon the pipeline and their location along the length of the pipe, and can also detect nearby events that may be potential threats to the pipeline. This allows embodiments to both tell when threats are approaching the pipeline, and when they actually impact upon the pipe. An alert may be sent upon one or both of these conditions.

Figure 1:
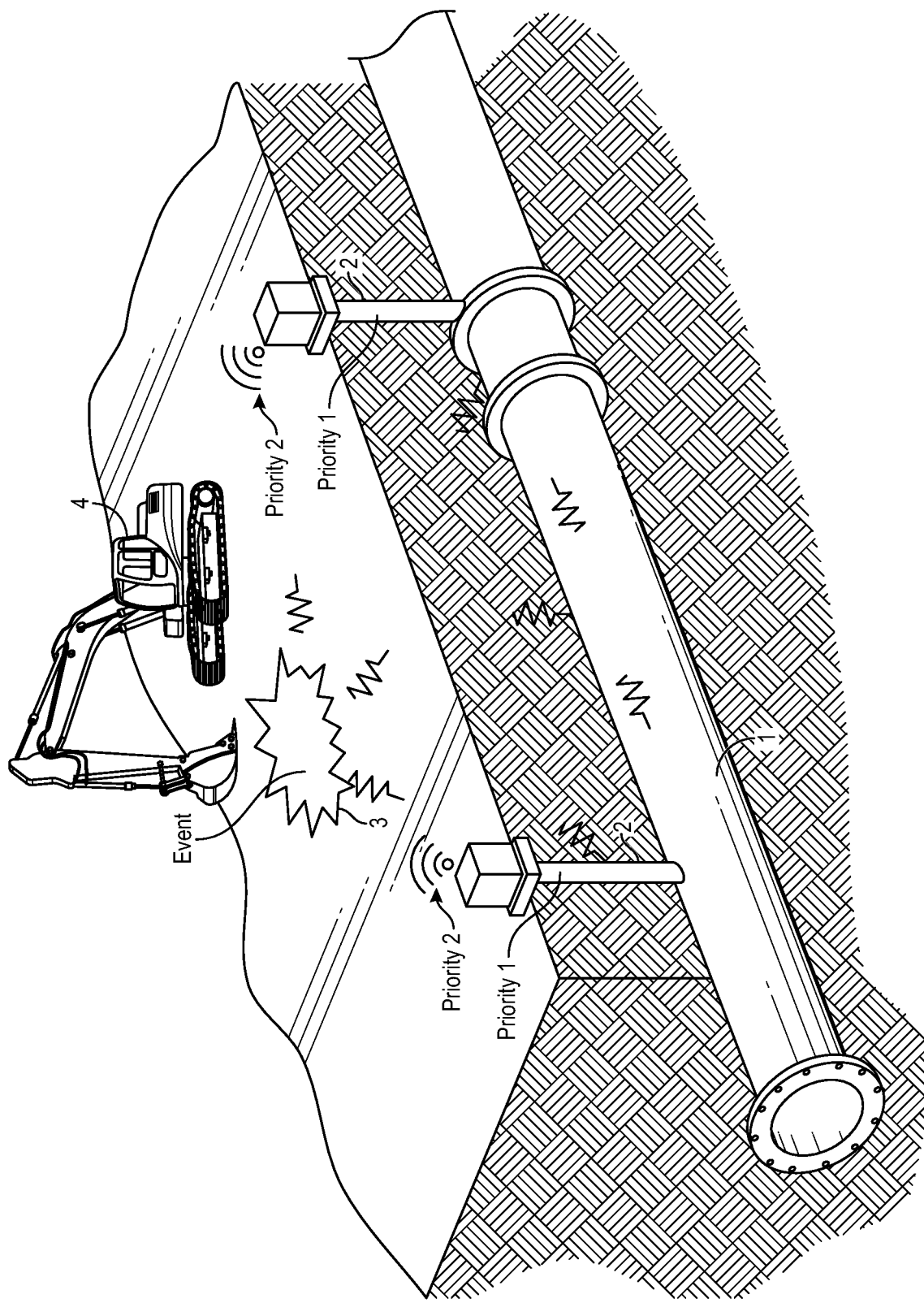
FIG. 1 is an isometric view illustrating implementation and operation of an embodiment of the present invention.

FIG. 1 is an isometric view illustrating implementation and operation of an embodiment of the present invention. Here, a pipeline 1 is located underground. One or more detection systems 2 are positioned both on the pipeline 1 and above ground. In particular, each detection system 2 has one set of sensors affixed or otherwise coupled to pipeline 1, and other sensors positioned above ground. A connecting member extends between the sensors on pipeline 1 and their corresponding above ground sensor, as shown.

In operation, the sensors positioned on the pipeline 1 detect stress waves propagating through the pipeline 1, where these stress waves result from impacts upon the pipeline 1. The magnitude of these stress waves may be used to determine the severity and location of such impact. Additionally, the above ground sensors of detection systems 2 detect audio signals emanating from nearby events such as the operation of machinery 4. The strength or magnitude of these audio signals, and/or detection of such audio signals from two different systems 2, may be used to determine the location of such machinery 4 or other audible events.

In this manner, the systems 2 may determine whether any threat is approaching the pipeline 1, when the threat actually impacts the pipeline 1, and where along the pipeline this impact has occurred. An alert may be sent warning users of any of these occurrences.

As the approach of a potential threat is less imminent a danger than an actual impact upon the pipeline 1, the detection of a remote yet audible event may be deemed a lower priority, e.g. Priority 2, while an actual detected impact may be given a higher priority, e.g. Priority 1. In other words, the sensors coupled to the pipeline 1 may be used to detect Priority 1 events, while the above ground sensors may be used to detect Priority 2 events.

Figure 2A:
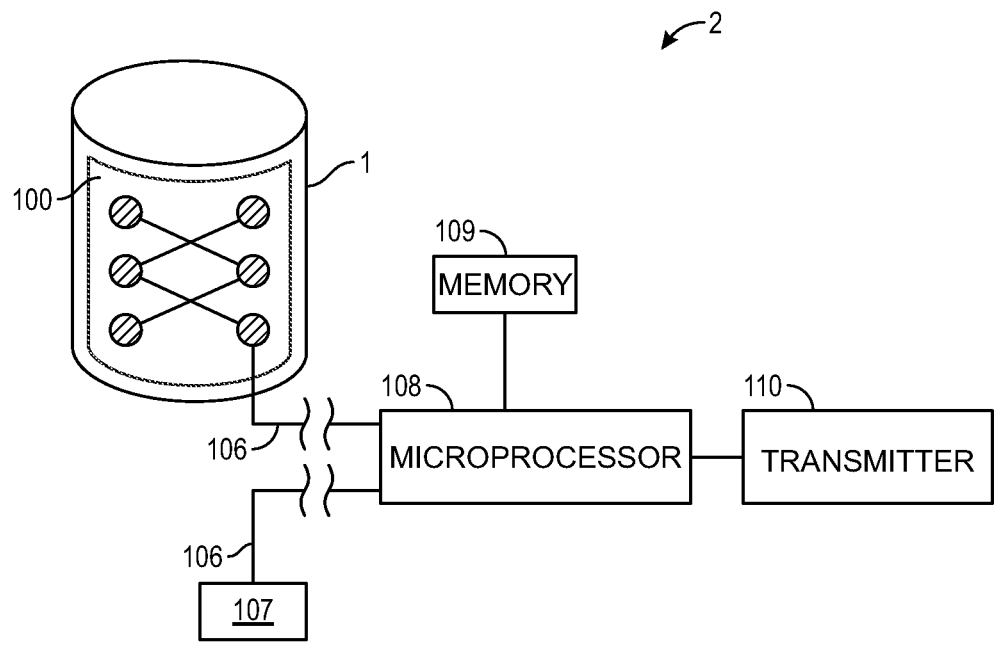
FIGS. 2A-2C illustrate an exemplary sensor system that can be used in conjunction with embodiments of the present invention.
Figure 2B:
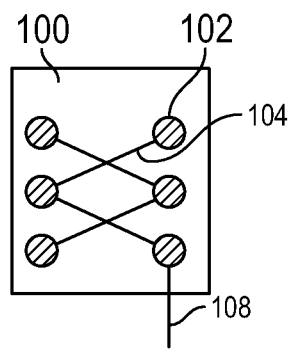
Figure 2C:
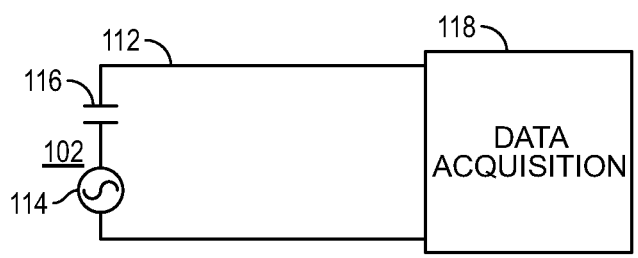

FIGS. 2A-2C illustrate an exemplary sensor system that can be used in conjunction with embodiments of the present invention. For purposes of illustration, one exemplary sensor system is shown in FIG. 2A, which shows a flexible sensing layer that can be affixed to a structure such as pipeline 1 and used in accordance with embodiments of the present invention. A diagnostic layer 100 is shown, which contains an array of sensors 102. The sensors 102 can be any sensors capable of generating and receiving signals used in structural health monitoring such as stress waves, and are connected to conductive traces 104. For example, embodiments of the invention can employ piezoelectric (PZT) transducers capable of both generating and detecting stress waves in a structure. The traces 104 connect (or interconnect, if necessary) sensors 102 to one or more output leads 106 configured for connection to a processor or other device capable of analyzing the data derived from the sensors 102.

The diagnostic layer 100 and its operation are known, and are further described in U.S. Pat. No. 6,370,964 to Chang et al., which is hereby incorporated by reference in its entirety and for all purposes. Construction of the diagnostic layer 100 is also explained in U.S. Pat. No. 7,413,919 to Qing et al., which is also incorporated by reference in its entirety and for all purposes. It should be noted that the present invention is not limited to the embodiments disclosed in the aforementioned U.S. Pat. No. 7,413,919, but instead encompasses the use of flexible sensor layers having any configuration.

For illustration, FIG. 2B further describes aspects of the operation of the diagnostic layer 100. In operation, the output leads 106 are electrically connected to an analysis unit such as a microprocessor 108, suitable for analyzing signals from the sensors 102. In certain embodiments, the flexible layer 100 is first attached to a structure in a manner that allows the sensing elements 102 to detect quantities related to the health of the structure. For instance, the sensors 102 can be sensors configured to detect stress waves propagated within the structure, and emit electrical signals accordingly. The microprocessor 108 then analyzes these electrical signals to assess various aspects of the health of the structure. For instance, detected stress waves can be analyzed to detect impacts upon the structure (e.g., pipeline 1) as described above. The stress waves can also be used to detect other properties related to impacts, such as resulting cracks or crack propagation within the structure, delamination within composite structures, or the likelihood of failure. Quantities such as these can then be transmitted to the user via transmitter 110.

In one embodiment, the sensors 102 can be piezoelectric transducers capable of reacting to a propagating stress wave by generating a voltage signal. Analysis of these signals highlights properties of the stress wave, such as its magnitude, propagation speed, frequency components, and the like. Such properties are known to be useful in structural health monitoring. FIG. 1C illustrates a circuit diagram representation of such an embodiment. This embodiment can often be represented as a circuit 112, where each sensor 102 is represented as a voltage source 114 in series with a capacitor 116 (impedance circuitry) used to adjust signal strength. This pair is in electrical contact with a data acquisition unit 118, such as a known data acquisition card employed by microprocessors 108 (the data acquisition unit 118 can be thought of as a component interface to the microprocessor 108). Propagating stress waves induce the sensor 102 to emit a voltage signal that is recorded by the data acquisition unit 118, where it can be analyzed to determine the health of the structure in question. These piezoelectric transducers can also act as actuators, converting an applied voltage to a stress wave signal.

The system of FIG. 2A also includes one or more sensors 107 in communication with microprocessor 108 via leads 106, similar to sensors 102. The sensors 107 correspond to the above ground sensors of FIG. 1, and may be audio sensors such as microphones that convert detected audible noises and convert them to digital or analog electrical signals sent to microprocessor 108 via leads 106. Memory 109 stores a number of acoustic signatures, such as in digital form, as well as the corresponding identity of each signature. For example, memory 109 may store the acoustic signatures of a backhoe, a tractor, the use of a pick or shovel, and the like, as well as indicators identifying each. The processor 108 may then retrieve each acoustic signature and compare it with the signals from the microphones 107. A sufficient match triggers the processor 108 to send an alert to the user via transmitter 110, along with the identity of the machine generating the acoustic signal. If the acoustic signal is of sufficient intensity (as measured in any manner) but no match occurs, the processor 108 may send an alert via transmitter 110, along with an indicator that the source of the audio event is unknown.

The processor 108 may also determine the distance between the event and the microphones 107, in any known manner, such as by comparing the energy of the received audio signal to a lookup table of intensity values and corresponding distances stored in memory 109, by triangulating the distance using multiple microphones 107 from multiple systems 2 located at different positions along pipeline 1, or the like. The calculated distance may also be sent to the user via transmitter 110, along with, optionally, a warning whose urgency is a function of the calculated distance (i.e., closer events generate more urgent warnings). This allows users to be alerted to approaching threats, and to take remedial action before the pipeline 1 is impacted.

Figure 3:
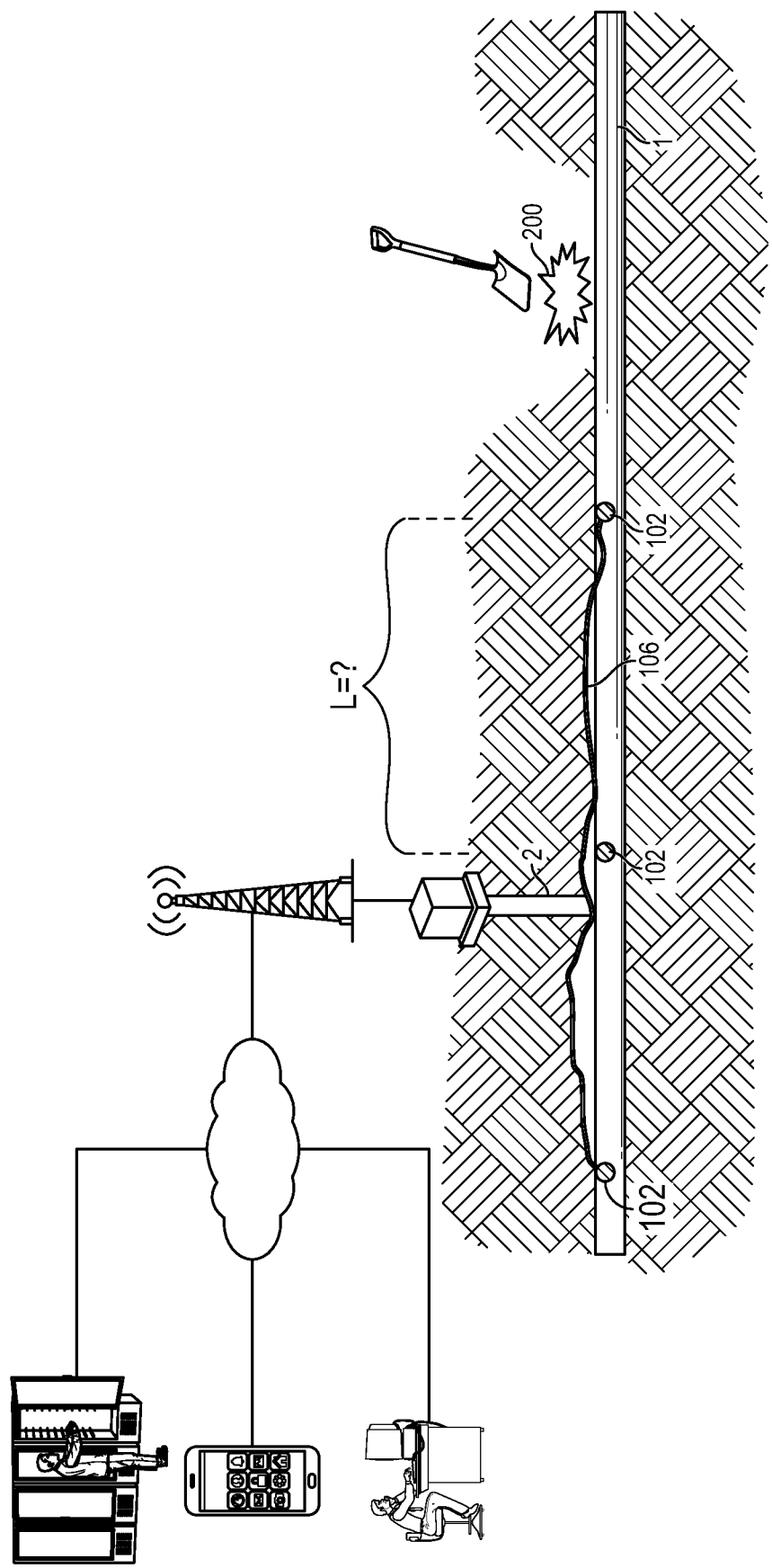
FIG. 3 is a side view further illustrating impact detection operation of the embodiment of FIG. 1.

FIG. 3 is a side view further illustrating impact detection operation of the embodiment of FIG. 1. Here, a single detection system 2 is shown, although any number of systems 2 may be placed along pipeline 1, at any locations. Each system 2 has a number of sensors 102 placed along the pipeline 1. As above, the sensors 102 may be positioned on a flexible layer 100, or may be placed individually and directly on the pipeline 1 as shown. The sensors 102 may be positioned at intervals L, which as below may be any distance suitable for sufficiently accurately detecting impacts and their locations.

When an impact 200 occurs upon the pipeline 1, such as when a shovel or other implement strikes the pipeline 1 as shown, the impact generates stress waves that propagate through the material of pipeline 1 and are detected by the sensors 102. The sensors 102 convert these stress waves to electrical signals and transmit them through their leads 106 to processor 108, which is not shown in FIG. 3 but which as above is a component of system 2. The processor 108 then determines the location of the impact 200, as well as optionally a measure of its severity. The location and severity measure may then be transmitted to users of the system 202, shown at the left of FIG. 3, via transmitter 110 located along with microphones 107 in the above ground unit of system 2 as shown. Signals from the transmitter 110 may be sent through any data communications network, such as cell towers transmitting to the Internet as shown.

Figure 4:
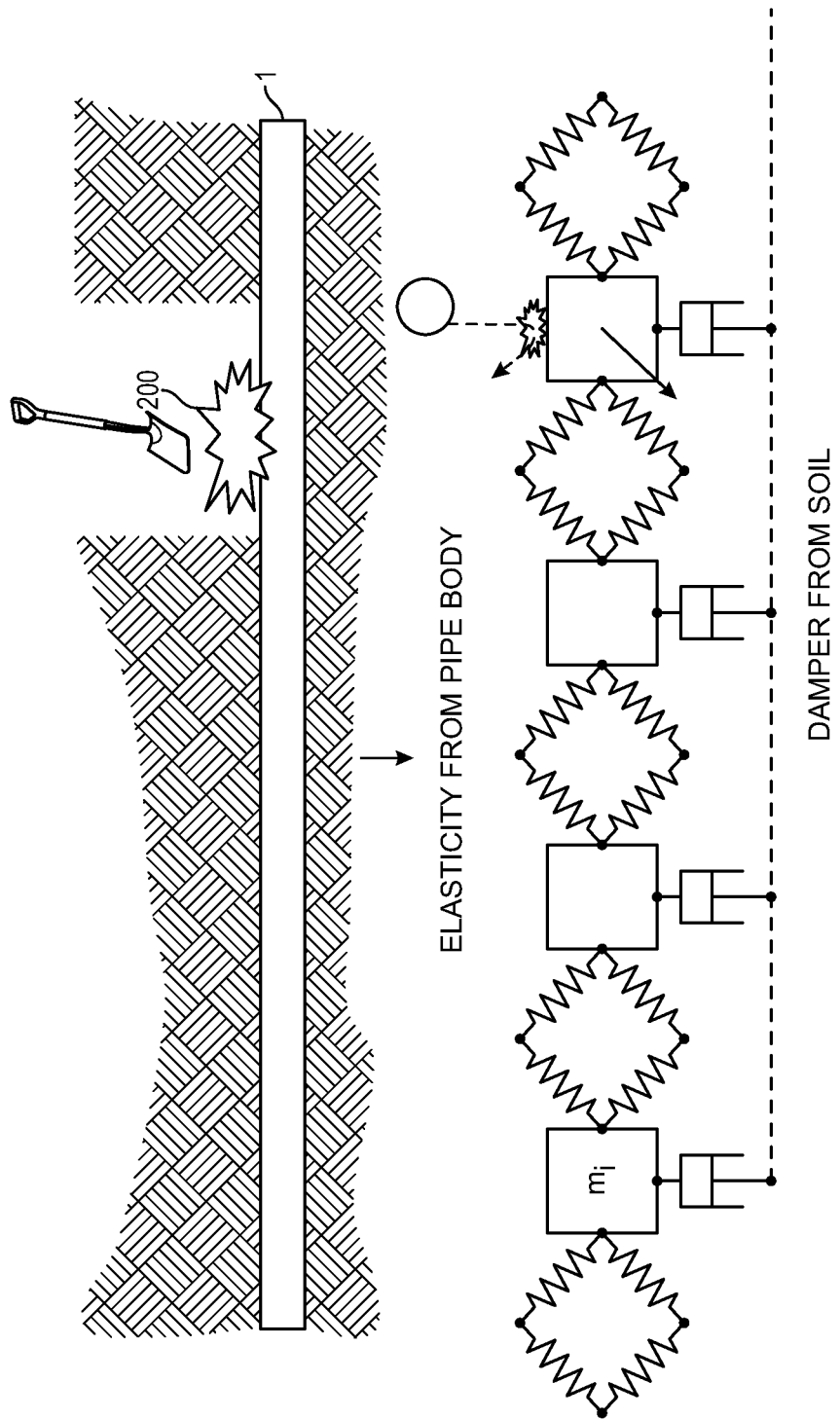

The determination of impact location may involve first a determination of initial impact energy, and second an estimation of the attenuation of this energy by location along pipeline 1. FIGS. 4 and 5 illustrate principles used in generating a model for estimating both initial impact energy and the attenuation profile of this energy along pipeline 1. Both of these quantities may then be employed to estimate the location of impact 200.

Initial impact energy may be determined according to FIG. 4, by modeling the pipe 1 as a series of discrete masses $m_i$ connected by springs as shown. Additionally, dampers may be added to act on each mass $m_i$, simulating the surrounding soil or other ground. From this model, it can be seen that initial impact energy may be determined according to:

$$E_0 = \frac{1}{2m_i}|m_i x v_i|^2 \qquad (1)$$

Here, $m_i$ may be simplified according to the mass-spring-damper model of FIG. 4 as $m_i = \rho A_c$, $\rho$=pipe material density, $A_c$=cross-sectional area of pipeline 1, and $|m_i \times v_i|^2$ is equivalent to the square of the integration of impulse-time, $\int f(t)\,dt$ of the impact.

It may be assumed that the initial impact energy $E_0$ determined from equation (1) above is distributed equally in both directions along pipeline 1, i.e. $0.5E_0$ is transmitted through pipeline 1 to the left, and $0.5E_0$ is transmitted through pipeline 1 to the right, as shown in the upper portion of FIG. 5.

The energy attenuation profile may then be determined, as it is known that, in each direction along pipeline 1, impact energy decreases from a maximum of $0.5E_0$ at the point of impact, and decays to zero with distance from the point of impact. It is known that energy attenuation or acoustic loss in solids may be determined according to an attenuation coefficient Q as:

$$\frac{2\pi}{Q} = \frac{\Delta E}{E} \quad (2)$$

so that:

$$\frac{1}{Q} = \frac{f_{\Delta E}\{C_{media}, \Delta L, E\}}{2\pi f_E\{\rho, A_C, F_{imp}(t)\}} \quad (3)$$

Here, $C_{media}$ is a pipe material constant that can be determined experimentally based on energy loss through the pipe, $\Delta L$ is the spacing between sensors (i.e. the quantity L in FIG. 3), $\rho$=density as above, $A_c$=cross-sectional area of pipeline 1 as above, and $F_{imp}$=impact force. It may be seen that equations (1) through (3) allow for determination of the energy attenuation profile of an impact along pipeline 1, that is the energy of an impact by position along pipeline 1. An exemplary such profile is shown in the lower half of FIG. 5. This profile allows for determination of the location of an impact 200, as once the maximum impact energy and actual energy received by the sensors 102 are known, the position along the attenuation profile is also known.

Figure 6A:
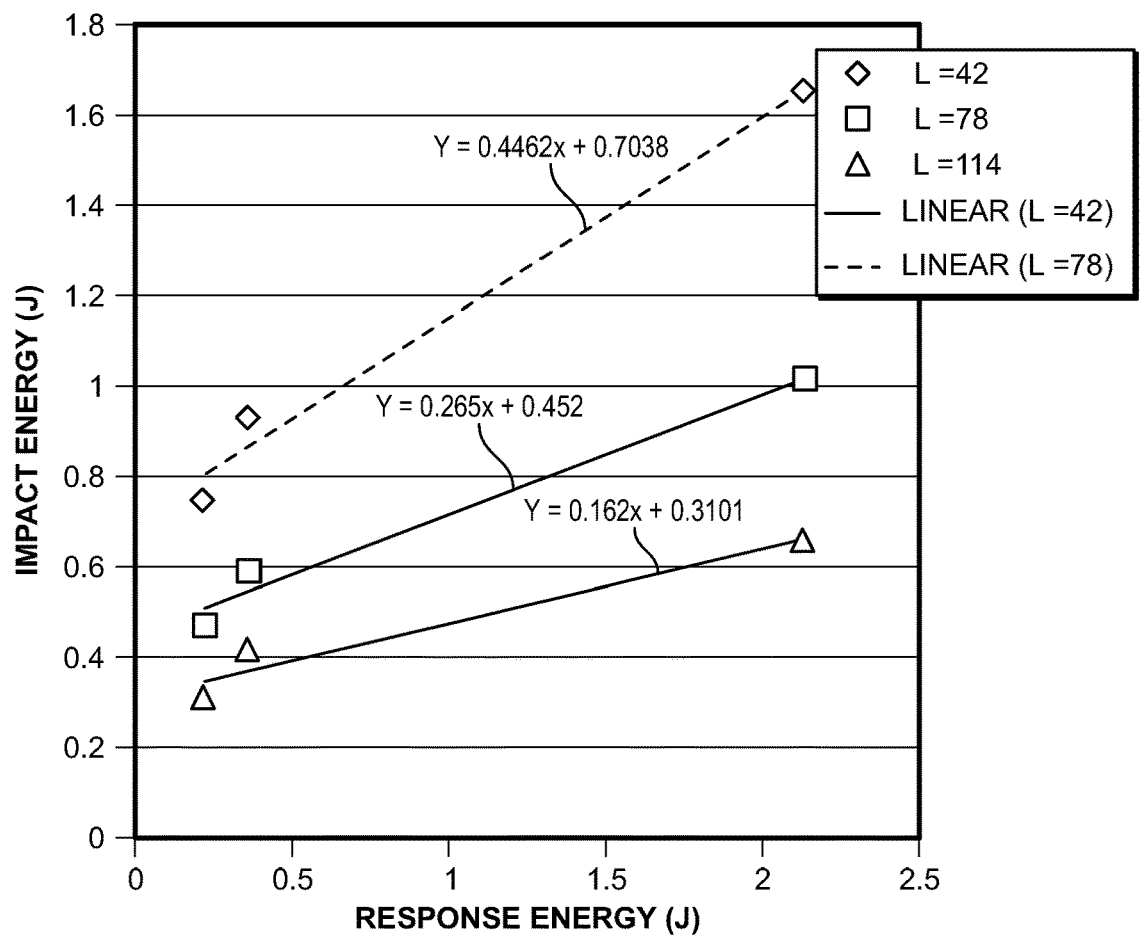
FIGS. 6A-6B graphically illustrate results of experiments for determining impact energy attenuation as a function of length along a buried pipe.
Figure 6B:
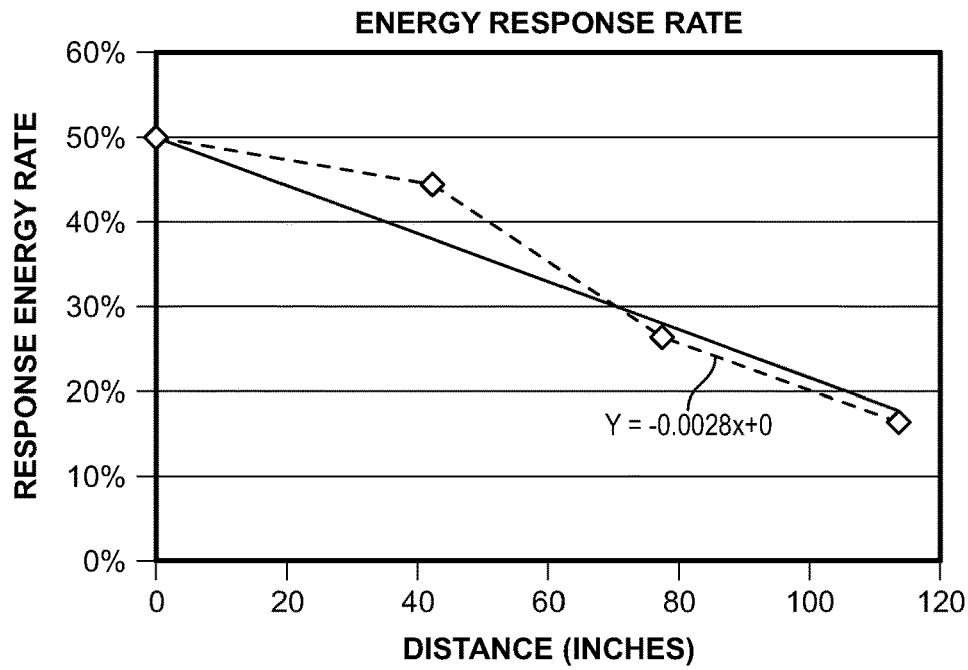

To solve equations (2) and (3), the quantity $\Delta L$, or the distance between sensors 102 in FIG. 3, is first determined. Quantity $\Delta L$ may be determined in any manner, but one approach is to determine this quantity experimentally. To that end, experiments were carried out to determine the energy response of a 2" conduit pipe in the buried condition. FIGS. 6A-6B graphically illustrate results of these experiments. In particular, FIG. 6A shows impact energy as a function of the energy detected by a PZT sensor 102 at different distances along the conduit pipe, and FIG. 6B shows the energy response rate, or the slopes of lines fitted to the data of FIG. 6A, versus the corresponding sensor distances.

FIG. 6A shows impact energy versus response energy for three different sensor distances: 42, 78, and 114 inches. As can be seen, each curve is higher, and the slopes of each curve increase, with decreasing distance. That is, the PZT sensors 102 are more responsive with decreasing distance from impact. In particular, the slope is greatest (44.6%), and the sensors thus most responsive, at a distance of 42 inches, after which the slope of each curve drops (to 26.5% and 16.2% respectively, for distances of 78 and 114 inches). FIG. 6B shows these curve slopes plotted as a function of distance, where it can be seen that at 42 inches, the sensors 102 are relatively more responsive (i.e. have a response rate above the linear "average" line of FIG. 6B), while at greater distance the sensors 102 are relatively less responsive (i.e. have a response rate below this line). The value of $\Delta L$ can thus be set to about 2×42=84 inches, so that impact always falls within approximately 42 inches of at least one sensor 102. In some embodiments, due to cost, tolerance issues, and/or other constraints, $\Delta L$ may be set to a slightly greater distance, e.g. 89 inches.

Figure 8:
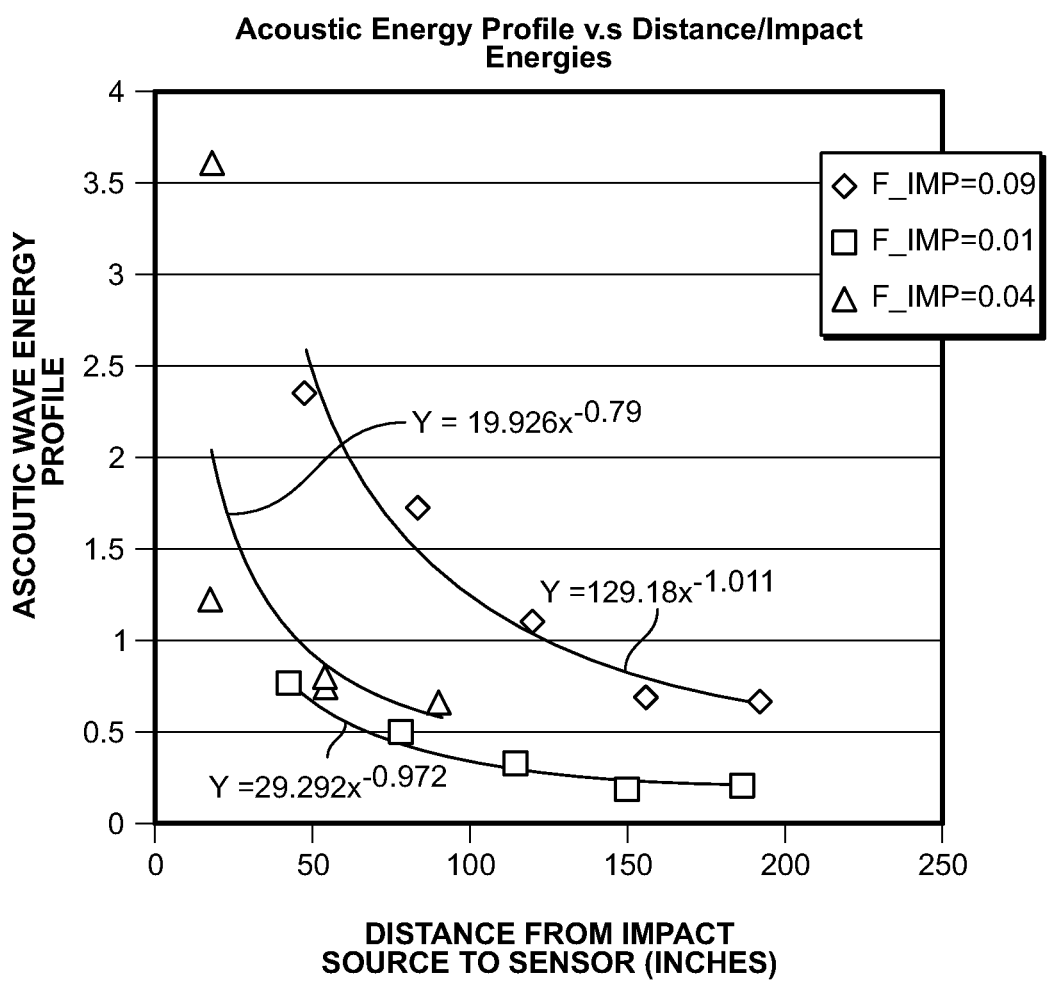
FIG. 8 and FIG. 9 graphically illustrate results of experiments for verifying a model used in estimating the location of nearby incidents.
Figure 9:
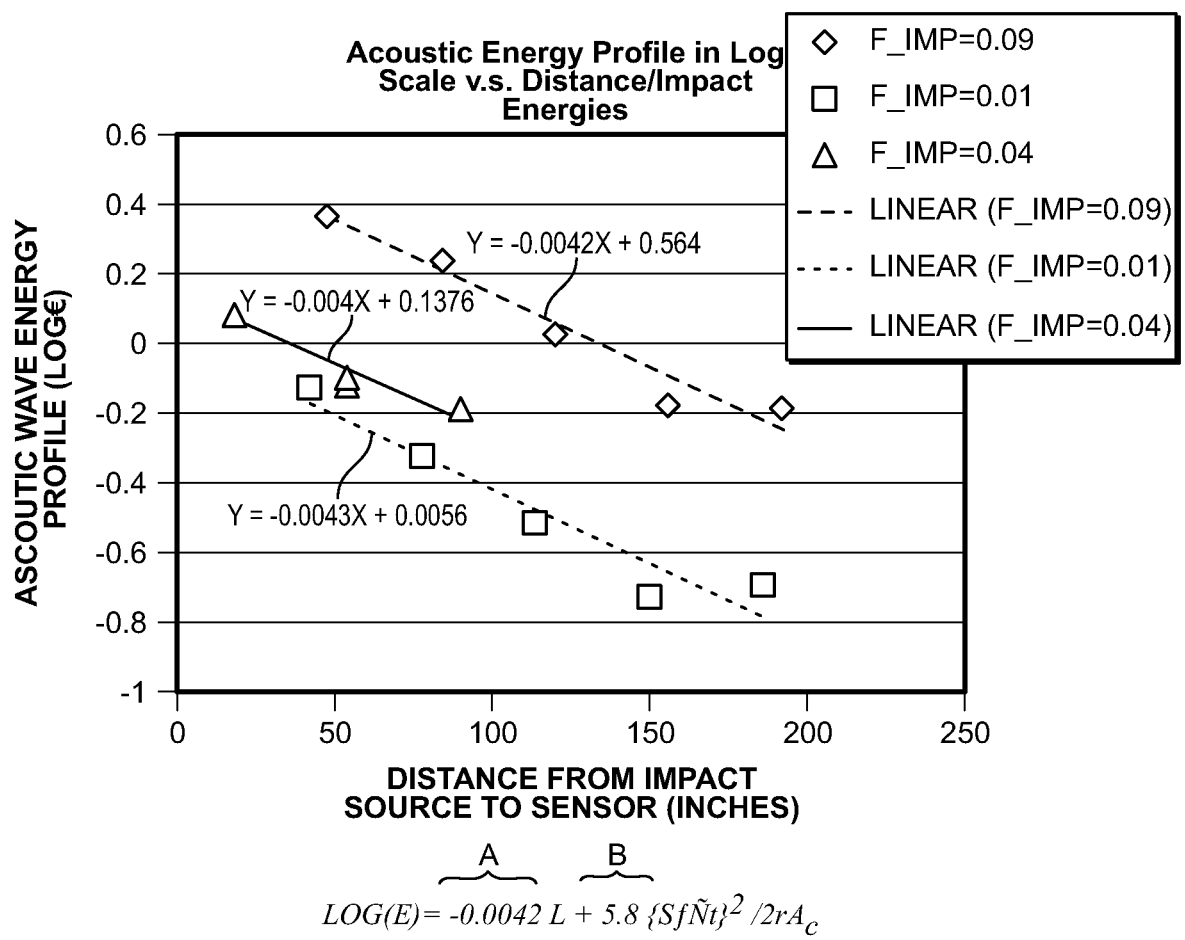

Once $\Delta L$ is determined, experiments can be carried out to determine attenuation coefficient Q using equations (2) and (3). FIG. 8 and FIG. 9 graphically illustrate results of experiments for determining Q. Here, experiments were carried out with the same experimental setup as that used in connection with FIGS. 6A-6B above. The total energy was measured for each impact by sensors positioned at the distances shown. FIG. 8 shows these detected energy values plotted as a function of distance from impact in inches, and FIG. 9 shows the same values plotted on a log scale. It can be seen that the relationship between detected energy and distance is linear on a log scale, with the slope of each line being approximately −0.0042. As shown in the equation at the bottom of FIG. 9, log(E) can thus be determined experimentally. From this, it can be seen that $\Delta(\log(E))=-0.0042 (\Delta L)$, so that $\log(E_1)-\log(E_2)=-0.0042(L_1-L_2)$, $E_1/E_2=e^{-0.0042\Delta L}$, and $\Delta E=|E_1-E_2|=(e^{0.0042|\Delta L|}-1)E_1$. Accordingly, Q can be determined from this and Equation (3) as $1/Q=\frac{1}{2}\pi(e^{0.0042|\Delta L|}-1)$.

The energy attenuation coefficient Q having been determined, the energy profile, e.g. the profile shown in FIG. 5, can then be determined from Equation (2). Accordingly, multiple measured energy values can be used to provide an estimate of the impact location, i.e. the location along the energy profile, and thus the location from the sensors 102, of an impact.

Figure 7:
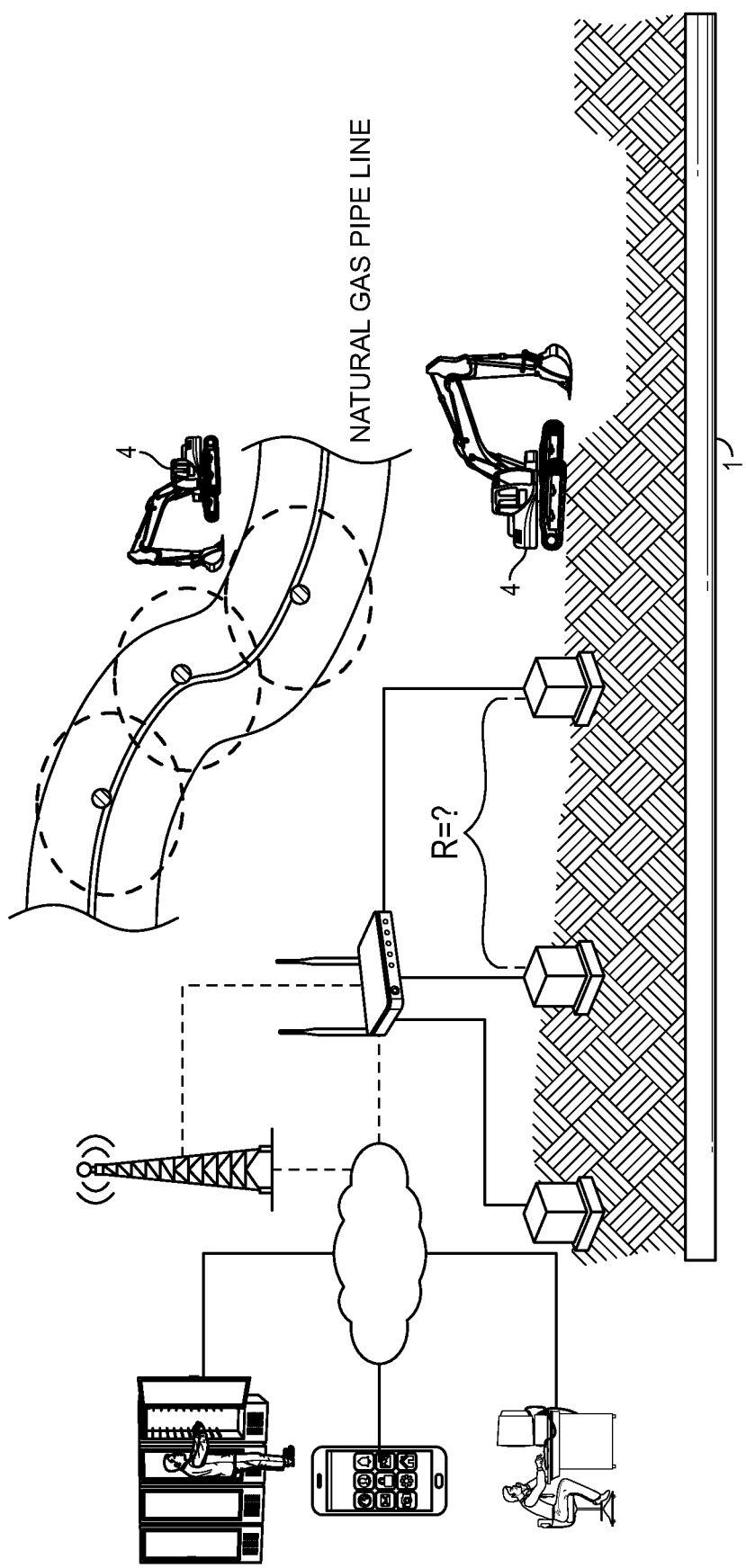
FIG. 7 is a side view further illustrating operation of the embodiment of FIG. 1 for estimating the location of nearby incidents.

Once impact location and intensity have been estimated, systems 2 transmit an alert to users, where this alert may indicate the estimated impact location and/or intensity if desired. As above, systems 2 also simultaneously detect nearby events via their microphones 107, comparing their audio signatures to stored audio signatures of known machines or events. Thus, systems 2 may transmit alerts upon either or both of an impact upon pipeline 1, or nearby audible events. As shown in FIG. 7, the above ground microphones 107 (i.e. systems 2) may be placed a distance R apart from each other, where R allows for at least some overlap between auditory ranges of the microphones 107 of adjacent systems 2. In this manner, no gaps exist in which auditory events may occur near pipeline 1 without being detected. The distance R may be any distance, and often depends on the specific microphone 107 and its sensitivity, as well as the local terrain near each microphone 107. Any suitable R values are contemplated.

Alerts may be sent in any manner, and may comprise any desired information. For example, alerts may include any one or more of: 1) whether an impact has occurred, 2) impact time, 3) impact location, 4) impact intensity, 5) whether an audible event has occurred, 6) audible event time, 7) audible event location and/or distance from pipeline, 8) the type of machine or event which caused the audible signal, if a match to stored audio signatures has occurred, and 9) and "unknown machine or event" indicator if no match occurs.

The processor 108 may also categorize events as Priority 1 or Priority 2 as above, as well as any other Priority categories as desired. For example, processor 108 may categorize events into three priority categories: Priority 1 for actual impacts upon pipeline 1, Priority 2 for encroachments occurring within some predetermined distance from pipeline 1 but which have not yet resulted in impact, and Priority 3 for encroachments occurring beyond this predetermined distance and which have not yet resulted in impact. The alert may thus also include any such priority information.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, any sensors 102 may be employed, whether PZT or otherwise, so long as they are capable of detecting stress waves within, or impacts upon, pipeline 1. Any alerts may be sent, in any manner, so long as they are capable of relaying the occurrence of impact and/or nearby audible events. Additionally, any methods may be used to determine impact location and/or intensity, whether theoretical or experimental, and whether they are based on determinations of impact energy or otherwise.

The embodiments were chosen and described in order to best explain the principles of the invention and its practical applications, to thereby enable others skilled in the art to best utilize the invention and various embodiments with various modifications as are suited to the particular use contemplated. Additionally, different features of the various embodiments of the present invention, disclosed or otherwise, can be mixed and matched or otherwise combined so as to create further embodiments contemplated by the invention.

What is claimed is:

1. A structural health monitoring system, comprising:
   a first set of sensors operable for coupling to a structure positioned under ground, the first set of sensors further configured to detect an impact upon the structure and a location of the impact upon the structure while the first set of sensors is positioned under the ground, the location of the impact along the structure determined at least in part according to an attenuation of impact energy by the ground;
   a second set of sensors operable to be positioned on or above a surface of the ground and located above the first set of sensors, the second set of sensors further configured to detect an audible event occurring at a distance from the second set of sensors and the structure;
   a connecting member extending between the first set of sensors and the second set of sensors; and
   a computer readable memory storing one or more audio signatures that may correspond to the audible event;
   wherein the first set of sensors is configured to detect stress waves propagating through the structure and the ground.

2. The structural health monitoring system of claim 1, wherein the first set of sensors comprises piezoelectric transducers.

3. The structural health monitoring system of claim 1, wherein the structure is a pipe or pipeline.

4. The structural health monitoring system of claim 1, further comprising:
   a controller in electronic communication with the first set of sensors and the second set of sensors; and
   a transmitter in electronic communication with the controller.

5. The structural health monitoring system of claim 4, wherein:
   the first set of sensors is configured to detect stress waves caused by the impact and propagating through the structure, to convert the detected stress waves to corresponding electrical signals, and to transmit the corresponding electrical signals to the controller; and
   the controller is configured to receive the transmitted corresponding electrical signals from the first set of sensors, to selectively generate an alert signal, and to transmit the alert signal to the transmitter.

6. The structural health monitoring system of claim 4, wherein:
   the first set of sensors is configured to convert the detected stress waves to corresponding stress signals, and to transmit the corresponding stress signals to the controller;
   the second set of sensors is configured to detect sound waves generated by the audible event, to convert the received sound waves to corresponding sound signals, and to transmit the corresponding sound signals to the controller; and
   the controller is configured to receive the transmitted corresponding stress signals and the corresponding sound signals from the first set of sensors and the second set of sensors, to selectively generate an alert signal, and to transmit the alert signal to the transmitter.

7. The structural health monitoring system of claim 6, wherein the controller is further configured to:
   retrieve the one or more audio signatures from the memory;
   compare the one or more audio signatures to the transmitted corresponding sound signals;
   upon a match between the one or more audio signatures and the transmitted corresponding sound signals, generate an identifier signal corresponding to the match; and
   transmit the identifier signal to the transmitter.

8. The structural health monitoring system of claim 6, wherein the alert signal further comprises a priority one alert characterized by an impact upon the structure, a priority two alert characterized by encroachments occurring within a predetermined distance from the structure, and a priority three alert characterized by encroachments occurring beyond the predetermined distance from the structure.

9. The structural health monitoring system of claim 1, further comprising a controller in electronic communication with the first set of sensors, the controller configured to estimate a location of the impact on the structure.

10. The structural health monitoring system of claim 9, wherein the controller is further configured to estimate the location according to a profile of energy generated by the impact.

11. The structural health monitoring system of claim 1, further comprising a controller in electronic communication with the second set of sensors, the controller configured to estimate a distance between the audible event and the structure.

12. The structural health monitoring system of claim 11, wherein the controller is further configured to estimate the distance between the audible event and the structure according to energies of sound waves generated by the audible event and detected by multiple ones of the second set of sensors.

13. The structural health monitoring system of claim 1, wherein a first sensor and a second sensor of the first set of sensors are separated by a length of the structure, wherein the length does not exceed 228 inches.

14. A pipeline monitoring system, comprising:
   a first set of sensors configured to be operably coupled to an underground pipeline, the first set of sensors further configured to detect stress waves associated with an impact upon the underground pipeline and a location of the impact upon the underground pipeline, the location of the impact along the structure determined at least in part according to an attenuation of impact energy by the ground;
   a second set of sensors configured to be operably positioned above ground to correspond to the pipeline and located above the first set of sensors, the second set of sensors further configured to detect an audible event occurring at a distance from the second set of sensors;
a connecting member extending between the first set of sensors and the second set of sensors; and
a controller in electronic communication with the first set of sensors and the second set of sensors, the controller configured to estimate the distance, and to estimate a location of the impact on the pipeline.

15. The pipeline monitoring system of claim 14, wherein:
the first set of sensors is configured to receive stress waves caused by the impact and propagating through the pipeline, to convert the received stress waves to corresponding electrical signals, and to transmit the corresponding electrical signals to the controller; and
the controller is configured to receive the transmitted corresponding electrical signals from the first set of sensors, and to selectively generate an alert signal according to an energy of the corresponding electrical signals.

16. The pipeline monitoring system of claim 14, wherein:
the second set of sensors is configured to detect sound waves generated by the audible event, to convert the received sound waves to corresponding signals, and to transmit the corresponding signals to the controller; and
the controller is configured to receive the transmitted corresponding signals from the second set of sensors, and to selectively generate a signal indicating a type of machine corresponding to the detected sound waves.

17. The pipeline monitoring system of claim 16, wherein the controller is further configured to:
retrieve one or more audio signatures corresponding to operational sounds of one or more machines; compare the one or more audio signatures to the transmitted corresponding signals; and
upon a match between the one or more audio signatures and the transmitted corresponding signals, generate an identifier signal identifying which of the one or more machines corresponds to the match.

18. The pipeline monitoring system of claim 14, wherein the controller is further configured to estimate the distance according to energies of sound waves generated by the audible event and detected by multiple ones of the second set of sensors.

19. The pipeline monitoring system of claim 14, wherein the first set of sensors comprises piezoelectric transducers.

20. The pipeline monitoring system of claim 14, wherein the second set of sensors comprises microphones.

* * * * *